(No Model.)
G. H. NYE.
RUBBER DECOY DUCK.
No. 351,709. Patented Oct. 26, 1886.
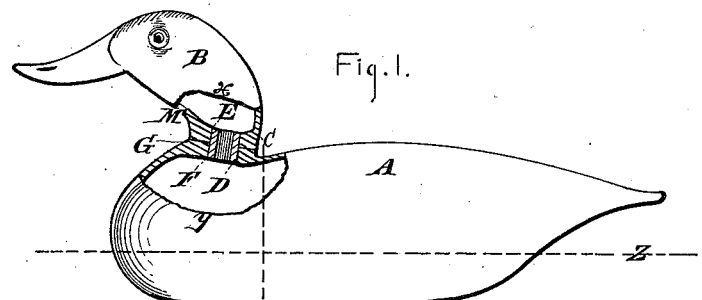
Fig. I.
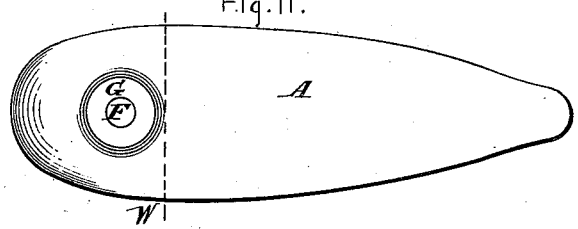
Fig. II.
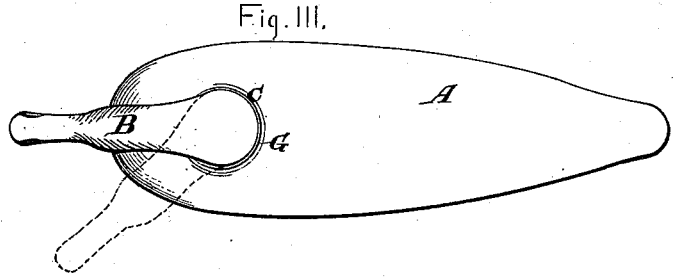
Fig. III.
Fig. VI.
Fig. V.
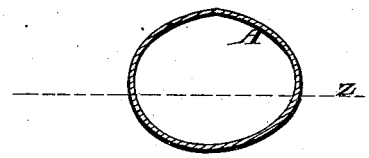
Fig. IV.
WITNESSES:
Thomas Herling.
F. H. Moore.
INVENTOR
George H. Nye.
BY G. L. Chapin,
ATTORNEY

UNITED STATES PATENT OFFICE.

GEORGE H. NYE, OF CHICAGO, ILLINOIS.

RUBBER DECOY-DUCK.

SPECIFICATION forming part of Letters Patent No. 351,709, dated October 26, 1886.

Application filed February 2, 1886. Serial No. 190,608. (No model.)

*To all whom it may concern:*

Be it known that I, GEORGE H. NYE, a citizen of the United States, residing in Chicago, in the county of Cook and State of Illinois, have invented new and useful Improvements in Rubber Decoy-Ducks, of which the following is a specification, reference being had to the accompanying drawings, illustrating the invention, in which—

Figure I is an elevation of a hollow rubber duck made in two parts, and a portion of the neck and body broken away to show the means for connecting the neck with the body. Fig. II is a plan or top view of the body of the duck with the neck removed; Fig. III, a plan or top view of the duck complete for use. Fig. IV is a transverse section of Figs. I and II on line $w$; Fig. V, an inverted view of the head and neck of the duck removed from the body. Fig. VI is a perspective representation of the tube with which the neck is connected with the body.

This invention relates to a rubber decoy-duck which is hollow and made in two parts—that is, a head and neck and body part are connected by a tube, whereby the air is driven through it and out through a hole in the head or neck when the ducks are packed in a compressed form for shipment. That the rubber may assume its original shape when unpacked and the ducks required for use, the shell is required to be so thick that it cannot be blown up by air or held in place by air, as is the case with rubber ducks now in use. Further than this, the decoy-duck must, to float properly, be heavier than an air sack or shell in order to be made operative.

Heretofore decoy-ducks have not been made with walls heavy enough by their own elasticity to assume the original shape after compression, for the reason that till my invented method of making such shells, as shown in my application of even date herewith, there were no means known to the art for that purpose.

A flat seat, G, is formed on the proper place on the body A of the duck, and a hole, F, is formed therein to communicate with the interior of the body-shell, and a corresponding hole, E, is formed in the base of the neck C; and inserted closely in these holes is a tube, D, of wood or other suitable material, the purpose of which is not only to hold the neck in any desired position on the body, but to allow air in the body-shell to escape into the head and out at an opening, M, which is preferably made beneath the head to prevent rain from getting into the shell.

I manufacture the whole duck, as shown at Fig. 1, of rubber, and make the body of wood, and attach the hollow rubber head and neck to it by means of a pin put in holes in the same manner as the tube D is inserted, and sell the heads thus made for others to attach to wooden ducks, thus utilizing what stock of wooden ducks there may be in the market and providing them with durable heads, which will not be constantly broken, as wooden heads are, by handling.

The decoy-ducks, as shown, can be packed in bags, boxes, or barrels for transportation without injury, as they will on being unpacked assume their proper shape.

I claim and desire to secure by Letters Patent—

In rubber decoy hunting-ducks, the hollow body part A, provided with the flat seat G, in combination with the adjustable hollow head B, which is connected with the body by the hollow tube D, the head B being provided with a perforation, M, which communicates with the hollow body A by means of the hollow tube D, as and for the purpose specified.

GEORGE H. NYE.

Witnesses:
G. L. CHAPIN,
E. J. WILBER.